(12) United States Patent
Kawahara et al.

(10) Patent No.: US 12,244,346 B2
(45) Date of Patent: Mar. 4, 2025

(54) WAVELENGTH CROSS CONNECT DEVICE AND WAVELENGTH CROSS CONNECT METHOD

(71) Applicant: Nippon Telegraph and Telephone Corporation, Tokyo (JP)

(72) Inventors: Hiroki Kawahara, Musashino (JP); Takeshi Seki, Musashino (JP); Sachio Suda, Musashino (JP); Kohei Saito, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 105 days.

(21) Appl. No.: 18/014,671

(22) PCT Filed: Jul. 6, 2020

(86) PCT No.: PCT/JP2020/026497
§ 371 (c)(1),
(2) Date: Jan. 5, 2023

(87) PCT Pub. No.: WO2022/009291
PCT Pub. Date: Jan. 13, 2022

(65) Prior Publication Data
US 2023/0275667 A1    Aug. 31, 2023

(51) Int. Cl.
*H04J 14/02* (2006.01)
*H04B 10/291* (2013.01)
*H04Q 11/00* (2006.01)

(52) U.S. Cl.
CPC ........ *H04B 10/291* (2013.01); *H04J 14/0212* (2013.01); *H04Q 11/0005* (2013.01);
(Continued)

(58) Field of Classification Search
CPC ............... H04B 10/291; H04J 14/0212; H04J 14/0217; H04J 14/02; H04J 14/0213;
(Continued)

(56) References Cited

U.S. PATENT DOCUMENTS 6,501,597 B1 * 12/2002 Pitt ..................... H01S 3/06775
359/333
6,509,987 B1 * 1/2003 Hunziker ............. H04B 10/291
398/79

(Continued)

FOREIGN PATENT DOCUMENTS

JP    2020137042    8/2020

OTHER PUBLICATIONS

Napoli et al., "Perspectives of Multi-band Optical Communication Systems," The 23rd OptoElectronics and Communications Conference (OECC 2018) Technical Digest, Jul. 2, 2018, 2 pages.

Primary Examiner — Dibson J Sanchez
(74) Attorney, Agent, or Firm — Fish & Richardson P.C.

(57) ABSTRACT

A wavelength cross-connect device performs a relay process in which multiple wavelength signal light beams that have been transmitted in multiple bands from a plurality of paths and demultiplexed into optical signals in the respective wavelength bands for each path are amplified, are switched to paths by contention WSSs, and are output to paths on the output side. A WXC unit performs the relay process on an optical signal in a specific wavelength band. An input-side conversion unit that converts a wavelength band other than the specific wavelength band into the specific wavelength band is provided on the input side, and an output-side conversion unit that converts the specific wavelength band after the conversion into the wavelength band prior to the conversion is provided on the output side. A directly-input (Continued)

optical signal in the specific wavelength band is directly output after the relay process at the WXC unit.

5 Claims, 6 Drawing Sheets

(52) U.S. Cl.
CPC ........... *H04J 14/02* (2013.01); *H04J 14/0213* (2013.01); *H04Q 11/0001* (2013.01); *H04Q 2011/0011* (2013.01); *H04Q 2011/0016* (2013.01)

(58) Field of Classification Search
CPC ....... H04Q 11/0005; H04Q 2011/0015; H04Q 2011/0016; H04Q 2011/0049; H04Q 11/0001; H04Q 2011/0011
USPC .................................................. 398/43–103
See application file for complete search history.

(56) References Cited

U.S. PATENT DOCUMENTS

| | | | |
|---|---|---|---|
| 10,903,930 B1* | 1/2021 | Moore | H04J 14/021 |
| 2002/0015551 A1* | 2/2002 | Tsuyama | H04J 14/0217 398/4 |
| 2004/0165816 A1* | 8/2004 | Oikawa | H04Q 11/0005 385/24 |
| 2004/0165818 A1* | 8/2004 | Oikawa | H04Q 11/0005 385/24 |
| 2005/0117837 A1* | 6/2005 | Cerato | G02B 6/29313 385/17 |
| 2006/0098981 A1* | 5/2006 | Miura | H04J 14/0213 398/45 |
| 2006/0198583 A1* | 9/2006 | Oikawa | H04Q 11/0005 385/53 |
| 2010/0221021 A1* | 9/2010 | Onaka | H04B 10/671 398/208 |
| 2011/0236023 A1* | 9/2011 | Shukunami | G02B 6/2931 398/81 |
| 2013/0279908 A1* | 10/2013 | Jenkins | H04J 14/0212 398/83 |
| 2015/0333835 A1* | 11/2015 | Matsukawa | H04J 14/0227 398/83 |
| 2016/0165324 A1* | 6/2016 | Zhao | G02B 6/2706 398/48 |
| 2018/0234749 A1* | 8/2018 | Chedore | H04Q 11/0005 |
| 2019/0075379 A1* | 3/2019 | Sato | H04Q 11/0005 |
| 2019/0109666 A1* | 4/2019 | Kato | H04J 14/0256 |
| 2019/0349112 A1* | 11/2019 | Seno | G02F 1/31 |
| 2019/0349113 A1* | 11/2019 | Komiya | H04B 10/0793 |
| 2019/0386767 A1* | 12/2019 | Yuki | H04B 10/572 |
| 2020/0059313 A1* | 2/2020 | Kato | H04B 10/25891 |
| 2020/0274633 A1 | 8/2020 | Yuki | |
| 2021/0263218 A1* | 8/2021 | Robertson | G02B 6/293 |

* cited by examiner

WAVELENGTH CROSS CONNECT DEVICE AND WAVELENGTH CROSS CONNECT METHOD

CROSS-REFERENCE TO RELATED APPLICATIONS

This application is a National Stage application under 35 U.S.C. § 371 of International Application No. PCT/JP2020/026497, having an International Filing Date of Jul. 6, 2020, the disclosure of which is considered part of the disclosure of this application, and is incorporated by reference in its entirety into this application.

TECHNICAL FIELD

The present invention relates to a wavelength cross-connect device and a wavelength cross-connect method to be used for multiband transmission in which multiple wavelength signal light obtained by multiplexing respective optical signals in different wavelength bands is transmitted through an optical fiber.

BACKGROUND ART

A wavelength cross-connect device that is used in a multiband transmission system is an optical node that connects desired paths in an optical network to an optical transmission line that transmits multiple wavelength signal light obtained by multiplexing optical signals in different wavelength bands or an optical transmission line formed with a plurality of optical fibers. In this wavelength cross-connect device, multiple wavelength signal light transmitted from a path on the input side is output to a path on the output side via a plurality of wavelength selective switches (WSSs).

FIG. 6 illustrates the configuration of a wavelength cross-connect device 20 to be used in a conventional multiband transmission system (also referred to as a system) 10.

The system 10 includes M wavelength band demultiplexers (also referred to as demultiplexers) 11a, 11b, . . . , and 11m connected to respective M paths denoted by reference sign Mi on the input side, and M wavelength band multiplexers (also referred to as multiplexers) 12a, 12b, . . . , and 12m connected to respective M paths denoted by reference sign Mo on the output side. The system 10 further includes the wavelength cross-connect device 20 that includes an S-band wavelength cross-connect (WXC) unit 21, a C-band WXC unit 22, and an L-band WXC unit 23 connected by optical fibers between the demultiplexers 11a to 11m and the multiplexers 12a to 12m. Note that the S-band WXC unit 21, the C-band WXC unit 22, and the L-band WXC unit 23 are also referred to as the WXC units 21 to 23.

As typically indicated by the L-band WXC unit 23 in FIG. 6, each of the WXC units 21 to 23 includes M optical amplifiers 24a, 24b, . . . , and 24m, and M WSSs 25a, 25b, . . . , and 25m on the input side. Each of the WSSs 25a to 25m has one input end and M output ends (1×M). Further, the L-band WXC unit 23 includes M WSSs 26a, 26b, . . . , and 26m having M input ends and one output end (M×1), and M optical amplifiers 27a, 27b, . . . , and 27m on the output side. The respective components of the optical amplifiers 24a to 24m, the WSSs 25a to 25m, the WSSs 26a to 26m, and the optical amplifiers 27a to 27m are connected by optical fibers or optical waveguides.

Although not illustrated in the drawing, the S-band WXC unit 21 and the C-band WXC unit 22 also include optical amplifiers 24a to 24m, WSSs 25a to 25m, WSSs 26a to 26m, and optical amplifiers 27a to 27m, like the L-band WXC unit 23 described above.

Multiple wavelength signal light beams 1a, 1b, . . . , and 1m transmitted in multiple bands through the respective M paths on the input side are input to the demultiplexers 11a to 11m as follows. That is, the multiple wavelength signal light beam 1a is input to the 1ba is input to the demultiplexer 11b, and the multiple wavelength signal light beam 1m is input to the demultiplexer 11m.

However, each of the multiple wavelength signal light beams 1a to 1m is obtained by multiplexing the respective optical signals in S-band, C-band, and L-band of the wavelength bands described later. The respective wavelength bands are S-band of 1460 nm to 1530 nm, C-band of 1530 nm to 1565 nm, and L-band of 1565 nm to 1625 nm, in ascending order of wavelength. The respective optical signals in S-band, C-band, and L-band are allocated to S-band, C-band, and L-band of the optical fibers as the paths at the time of transmission.

Note that, in FIG. 6, S-band, C-band, and L-band of the optical signals are indicated by "S", "C", and "L" on the transmission paths of the optical signals.

The demultiplexer 11a demultiplexer the multiple wavelength signal light beam 1a into the respective optical signals in S-band, C-band, and L-band, and outputs the optical signals to the optical amplifiers 24a of the respective WXC units 21 to 23. That is, the demultiplexer 11a outputs the demultiplexed S-band optical signal to the optical amplifier 24a of the S-band WXC unit 21, outputs the C-band optical signal to the optical amplifier 24a of the C-band WXC unit 22, and outputs the L-band optical signal to the optical amplifier 24a of the L-band WXC unit 23.

Like the demultiplexer 11a described above, the other demultiplexers 11b to 11m demultiplex the multiple wavelength signal light beams 1b to 1m into the respective optical signals in S-band, C-band, and L-band, and outputs the optical signals to the optical amplifiers 24b to 24m of the respective WXC units 21 to 23.

The optical amplifiers 24a to 24m of the WXC units 21 to 23 amplify the respective optical signals in S-band, C-band, and L-band, and output the amplified optical signals to the WSSs 25a to 25m of the respective WXC units 21 to 23.

Each of the WSSs 25a to 25m has functions of selecting an optical signal of each wavelength band, adjusting the attenuation amount, and the like. The M output ends of the respective WSSs 25a to 25m are connected to the M input ends of the WSSs 26a to 26m on the output side.

For example, the WSS 25a outputs the L-band optical signal from a first output end shown at the top to a second input end of the WSS 26a on the output side, outputs the L-band optical signal from a second output end to an input end of a WSS (not shown) on the output side, and outputs the L-band optical signal from a third output end to a first input end of the WSS 26m on the output side. In this manner, the L-band optical signal is output from each output end of one WSS 25a to input ends of different WSSs 26a to 26m.

Each of the WSSs 26a to 26m on the output side sequentially selects optical signals of a plurality of wavelength bands input from the M input ends, and outputs the optical signals from one output end to the optical amplifiers 27a to 27m.

The output ends of the respective optical amplifiers 27a to 27m are connected to the multiplexers 12a to 12m. With this arrangement, the optical amplifiers 27a to 27m amplify the respective optical signals in S-band, C-band, and L-band, and then output the amplified S-band, C-band, and L-band optical signals to the corresponding multiplexers 12a to 12m. After this output, the respective multiplexers 12a to 12m multiplex the respective S-band, C-band, and L-band optical signals amplified by the optical amplifiers 27a to 27m of the respective WXC units 21 to 23. The multiple wavelength signal light beams obtained by this multiplexing are transmitted in multiple bands to M paths Mo.

Non Patent Literature 1 discloses a conventional technology relating to such a wavelength cross-connect device 20.

CITATION LIST

Non Patent Literature

Non Patent Literature 1: A. Napoli et al., "Perspectives of Multi-band Optical Communication Systems," OECC2018, 5B3-1, July 2018.

SUMMARY OF INVENTION

Technical Problem

The wavelength cross-connect device 20 described above is compatible with multiband transmission, and needs to include the S-band WXC unit 21, the C-band WXC unit 22, and the L-band WXC unit 23 corresponding to the respective S-band, C-band, and L-band optical signals demultiplexed by the demultiplexers 11a. Therefore, both the device size and the power consumption increases threefold or more, compared with those of a wavelength cross-connect device compatible with a single band.

Further, as for the configurations of the respective WXC units 21 to 23, there are differences in optical characteristics due to the differences among the wavelength bands of S-band, C-band, and L-band, and accordingly, differences appear in the transmission performance for the respective optical signals in S-band, C-band, and L-band. For example, there will be wavelength band dependency of the transmission bands and optical loss in the WSSs and the optical amplifiers.

Furthermore, the technical maturity of the components that are used in the optical devices such as the WSSs and the optical amplifiers of the respective WXC units 21 to 23 varies depending on wavelength bands. If the technical maturation period required for optical component improvement and the like necessary for securing a certain level of optical performance (the transmission band, optical loss, and the like) varies depending on wavelength bands, the time to implement multiband-compatible WXC is limited by the technical maturation of the optical devices in the wavelength band that most requires the technical maturation period. For example, the technical maturity of an optical device is the highest in C-band, which is most frequency used in general optical transmission systems, followed by L-band and S-band in descending order. Therefore, the time to implement multiband-compatible WXC is limited by an optical device in S-band that requires a technical maturation period.

The present invention has been made in view of such circumstances, and aims to reduce device size and power consumption, eliminate differences in transmission performance for respective optical signals due to different wavelength bands of WXC, and prevent the time to implement multiband-compatible WXC from being limited by an optical device in the wavelength band that most requires a technical maturation period.

Solution to Problem

To solve the above problem, the present invention is a wavelength cross-connect device that performs a relay process of amplifying, with an optical amplifier, optical signals in respective wavelength bands formed by demultiplexing multiple wavelength signal light into different wavelength bands for each path, changing paths with a contention wavelength selective switch (WSS) having a plurality of input ends and a plurality of output ends, and outputting the optical signals to a path on the output side, the multiple wavelength signal light being formed by multiplexing respective optical signals in a plurality of wavelength bands transmitted in multiple bands through an optical transmission line formed with one or a plurality of optical fibers. The wavelength cross-connect device includes: a wavelength cross-connect (WXC) unit that includes the optical amplifier and the contention WSS, and performs the relay process on an optical signal in a predetermined specific wavelength band among the different wavelength bands; an input-side conversion unit that is disposed on the input side of the WXC unit, and converts an optical signal in a wavelength band other than the specific wavelength band into an optical signal in the specific wavelength band; and an output-side conversion unit that is disposed on the output side of the WXC unit, and converts the optical signal in the specific wavelength band converted by the input-side conversion unit into the optical signal prior to conversion. The optical signal in the specific wavelength band that has been input directly from the input side is directly output after the relay process at the WXC unit.

Advantageous Effects of Invention

According to the present invention, it is possible to reduce device size and power consumption, eliminate differences in transmission performance for respective optical signals due to different wavelength bands of WXC, and prevent the time to implement multiband-compatible WXC from being limited by an optical device in the wavelength band that most requires a technical maturation period.

DESCRIPTION OF EMBODIMENTS

Figure 1:
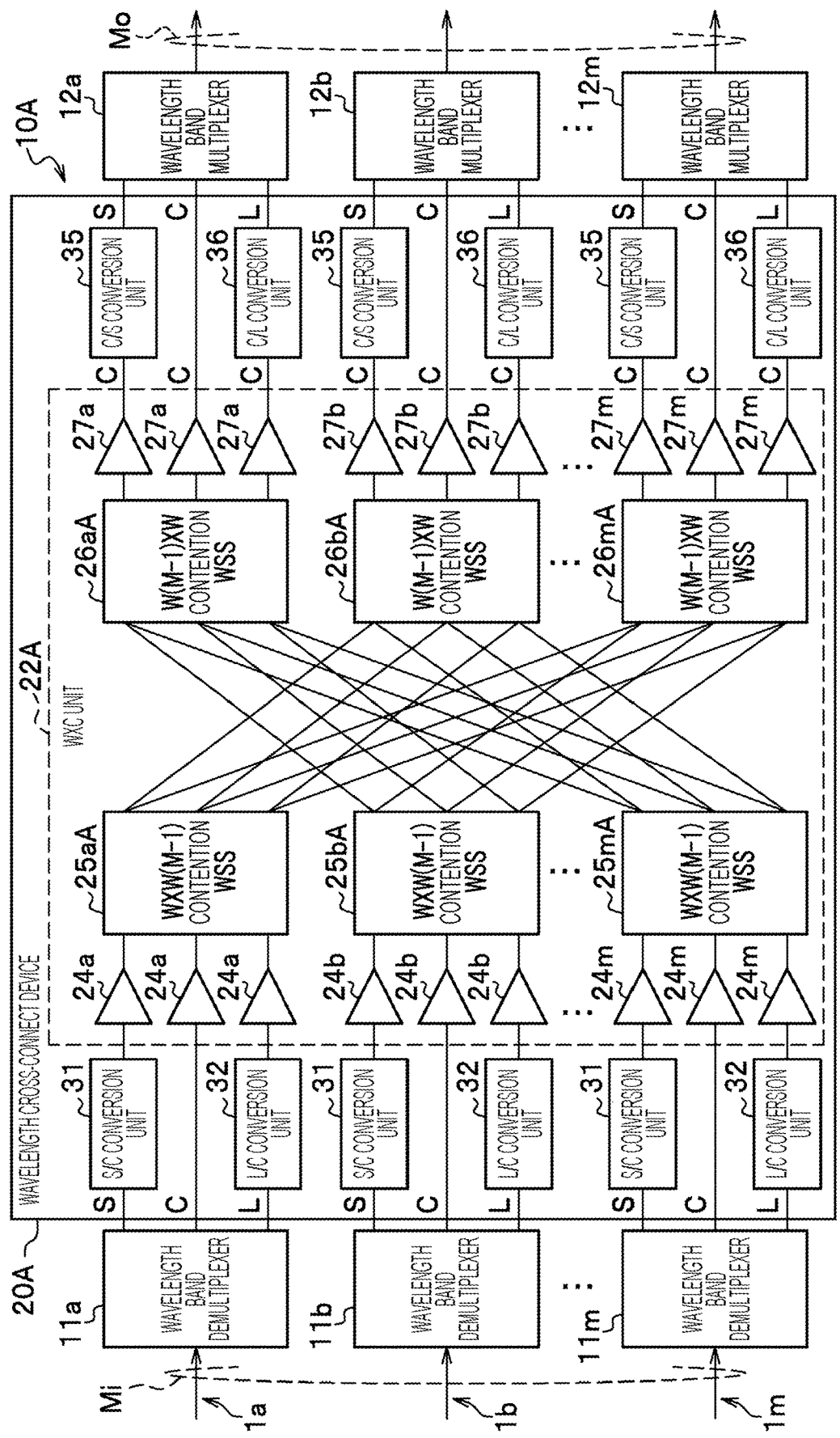
FIG. 1 is a block diagram illustrating the configuration of a multiband transmission system using a wavelength cross-connect device according to an embodiment of the present invention.

Embodiments of the present invention will be described below, with reference to the drawings. However, in all the drawings in this description, components having corresponding functions are denoted by the same reference numerals, and explanation thereof will not be unnecessarily repeated.

Configuration of an Embodiment

FIG. 1 is a block diagram illustrating a configuration of a multiband transmission system using a wavelength cross-connect device according to an embodiment of the present invention.

Figure 6:
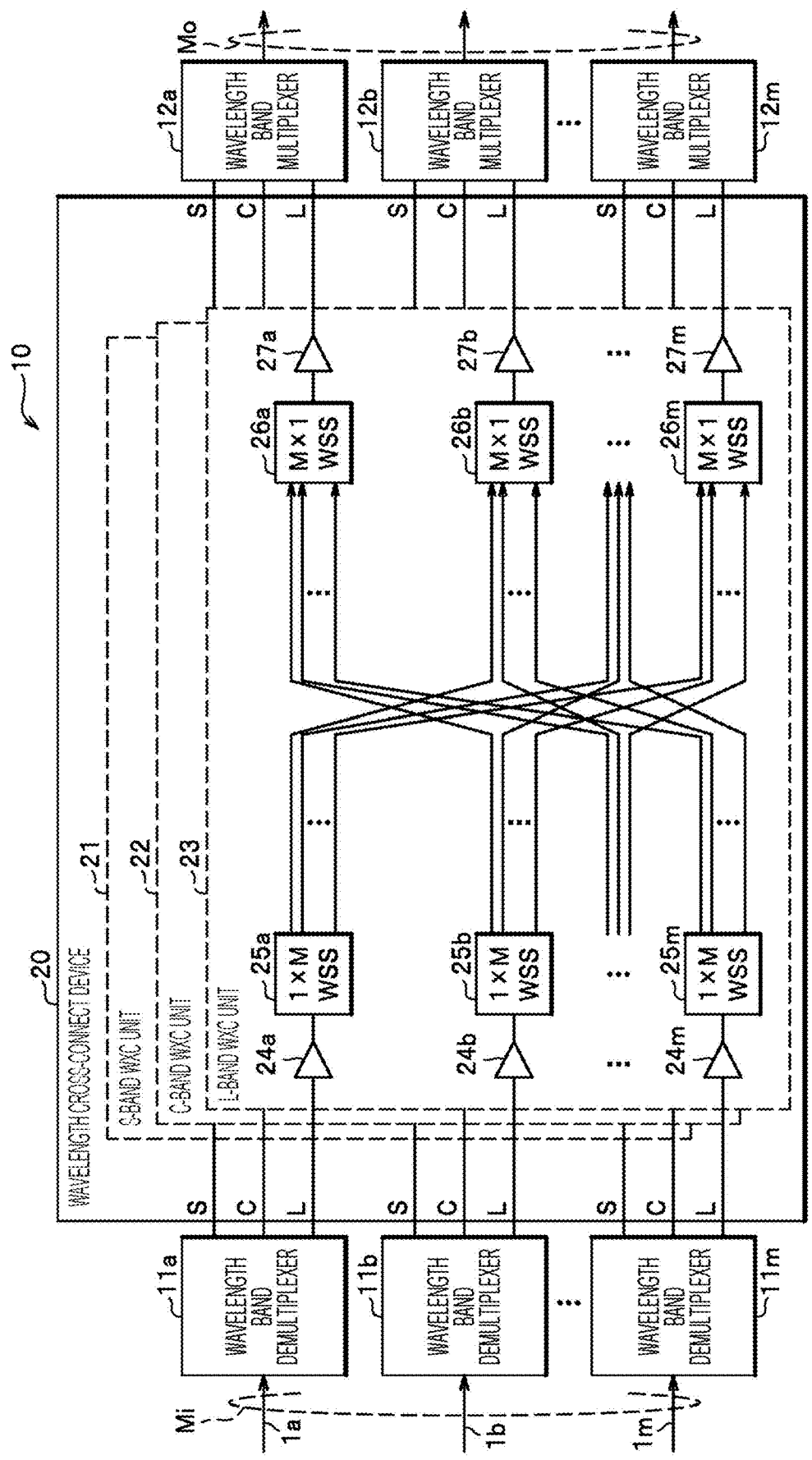
FIG. 6 is a block diagram illustrating the configuration of a multiband transmission system using a conventional wavelength cross-connect device.

A wavelength cross-connect device 20A applied to a multiband transmission system 10A of the embodiment illustrated in FIG. 1 differs from the conventional wavelength cross-connect device 20 (FIG. 6) in including, between the demultiplexers 11a to 11m and the multiplexers 12a to 12m, S/C conversion units 31, L/C conversion units 32, and optical amplifiers 24a to 24m on the input side, one WXC unit 22A, and optical amplifiers 27a to 27m, C/S conversion units 35, and C/L conversion units 36 on the output side.

The WXC unit 22A handles wavelengths in C-band, which is the wavelength band having the highest technical maturity (referred to as the specific wavelength band) among the WXC component described above. The WXC unit 22A includes, on the input side, m sets of optical amplifiers 24a, 24b, ..., and 24m, and m W×W(M−1) contention WSSs (also referred to as WSSs) 25aA, 25bA, ..., and 25mA, each set of optical amplifiers being formed with three optical amplifiers. On the output side, there are m W(M−1)×W contention WSSs 26aA, 26bA, ..., and 26mA, and M sets of optical amplifiers 27a, 27b, ..., and 27m, each set of optical amplifiers being formed with three optical amplifiers.

As for W×W(M−1) or W(M−1)×W in the above expression, W represents the number of wavelength bands, and in this example, is the three wavelength bands of S-band, C-band, and L-band. M represents the number of paths at either the input end or the output end of each of the WSSs 25aA to 25mA and each of the WSSs 26aA to 26mA. This number of paths is two in this example, because there are at least two path at one end as indicated by the three output ends of the WSS 26aA, for example.

In view of this, the first term "W" of W×W(M−1) of the WSSs 25aA to 25mA on the input side represents the number of input ends, which is three, since the number of wavelength bands is three. The second term "W(M−1)" represents the number of output ends, which is three, since 3(2−1)=3. Two signals in the same wavelength band are output from each of the three output ends.

The first term W(M−1) of W(M−1)×W of the WSSs 26aA to 26mA on the output side represents the number of input ends, which is three, since 3(2−1)=3. Two signals in different wavelength bands are input to each of the three input ends. The second term "W" represents the number of output ends, which is three in this example.

Meanwhile, the input ends and the output ends of the WSSs 25aA to 25mA and 26aA to 26mA are defined as a first input end, a second input end, and a third input end, and a first output end, a second output end, and a third output end from the top. The first output end of the WSS 25aA on the input side is connected to the first input ends of the WSS 26bA and the WSS 26mA on the output side. The second output end of the WSS 25aA on the input side is connected to the second input ends of the WSS 26bA and the WSS 26mA on the output side. The third output end of the WSS 25aA on the input side is connected to the third input ends of the WSS 26bA and the WSS 26mA on the output side.

In other words, the first input end of the WSS 26bA on the output side, for example, is connected to the first output ends of the WSS 25aA and the WSS 25mA on the input side. That is, the connection is made so that two optical signals in the same wavelength band after demultiplexing performed by the demultiplexers 11a to 11m are input to the first input end of the WSS 26bA on the output side. Likewise, the other WSSs 25bA to 25mA and WSSs 26bA to 26mA are connected as indicated by connection lines in the drawings.

A contention WSS has a plurality of input ends and a plurality of output ends, and has functions of selecting optical signals in the respective wavelength bands, adjusting attenuation amount, and the like. Further, as described above, a contention WSS has a function of processing a plurality {W or W(M−1)} of inputs and a plurality {W(M−1) or W} of outputs of optical signals. However, in a case where optical signals of the same wavelength are input to a plurality of input ends, collisions (contentions) among the optical signals occur. Therefore, the configuration is set so that any contention does not occur.

For example, in the WSS 25aA, optical signals in C-band, which includes 96 wavelengths whose wavelength multiplexing numbers are wavelengths $\lambda 1$ to $\lambda 96$, are input to the three inputs ends, which are the first to third input ends, but the settings are such that the same wavelength is not simultaneously input to the three input ends. In other words, the settings are such that C-band optical signals of different wavelengths from one another are simultaneously input to the three input ends. For example, the settings are such that an optical signal of the C-band wavelength $\lambda 1$ is input to the first input end of the WSS 25aA, an optical signal of the C-band wavelength $\lambda 2$ is input to the second input end, and an optical signal of the C-band wavelength $\lambda 3$ is input to the third input end.

Next, the multiple wavelength signal light beams 1a, 1b, ..., and 1m that have been transmitted in multiple bands through the respective M paths on the input side are demultiplexed into S-band, C-band, and L-band optical signals by the demultiplexers 11a to 11m. The demultiplexed S-band optical signals are input to the WSSs 26aA to 26mA via the S/C conversion units 31 described later and the optical amplifiers 24a to 24m. The demultiplexed C-band optical signals are input to the WSSs 26aA to 26mA via the optical amplifiers 24a to 24m. The demultiplexed L-band optical signals are input to the WSSs 26aA to 26mA via the L/C conversion units 32 described later and the optical amplifiers 24a to 24m.

The S/C conversion units 31 convert the S-band optical signals into the C-band optical signals, and the L/C conversion units 32 convert the L-band optical signals into the C-band optical signals. Note that the S/C conversion units 31 and the L/C conversion units 32 constitute the input-side conversion unit of the claims.

The connection configuration between the respective output ends of the demultiplexers 11a to 11m and the input ends of the WXC unit 22A is as follows. That is, the output end that outputs the S-band optical signal obtained by the demultiplexer 11a demultiplexing the S-band, C-band, and L-band multiple wavelength signal light beam 1a transmitted in multiple bands from the input-side path is connected to an optical amplifier 24a of the WXC unit 22A via an S/C conversion unit 31. Also, the output end of the C-band optical signal of the demultiplexer 11a is connected directly to the input end of an optical amplifier 24a of the WXC unit 22A. Further, the output end of the L-band optical signal of the demultiplexer 11a is connected to the input end of an optical amplifier 24a of the WXC unit 22A via an L/C conversion unit 32.

Meanwhile, the output end that outputs the S-band optical signal obtained by the demultiplexer 11b demultiplexing the multiple wavelength signal light beam 1b from the input-side path is connected to an optical amplifier 24b of the WXC unit 22A via an S/C conversion unit 31. Also, the output end of the C-band optical signal of the demultiplexer 11a is connected directly to the input end of an optical amplifier 24b of the WXC unit 22A. Further, the output end of the L-band optical signal of the demultiplexer 11a is connected to the input end of an optical amplifier 24a of the WXC unit 22A via an L/C conversion unit 32.

Further, the output end that outputs the S-band optical signal obtained by the demultiplexer 11m demultiplexing the multiple wavelength signal light beam 1m from the input-side path is connected to an optical amplifier 24m of the WXC unit 22A via an S/C conversion unit 31. Also, the output end of the C-band optical signal of the demultiplexer 11a is connected directly to the input end of an optical amplifier 24m of the WXC unit 22A. Further, the output end of the L-band optical signal of the demultiplexer 11a is connected to the input end of an optical amplifier 24m of the WXC unit 22A via an L/C conversion unit 32.

Next, the C/S conversion units 35 connected to optical amplifiers 27a to 27m on the output side of the WXC unit 22A convert the C-band optical signals, which have been converted from the S-band optical signals by the S/C conversion units 31 on the input side, into S-band optical signals. Also, the C/L conversion units 36 connected to optical amplifiers 27a to 27m include C/L conversion units 36 that convert the C-band optical signals, which have been converted from the L-band optical signals by the L/C conversion units 32 on the input side, into L-band optical signals. Note that the C/S conversion units 35 and the C/L conversion units 36 constitute the output-side conversion unit of the claims.

Also, in the WXC unit 22A, the output ends that output the C-band optical signals, which have been input directly from the input ends, are connected directly to the input ends of the multiplexers 12a to 12m.

Configuration of a Wavelength Band Conversion Unit

The circuit configurations of the S/C conversion units 31, the L/C conversion units 32, the C/S conversion units 35, and the C/L conversion units 36 described above are substantially the same. Therefore, the circuit configuration of an L/C conversion unit 32 is illustrated as a typical configuration in FIG. 2, and is now explained.

Figure 2:
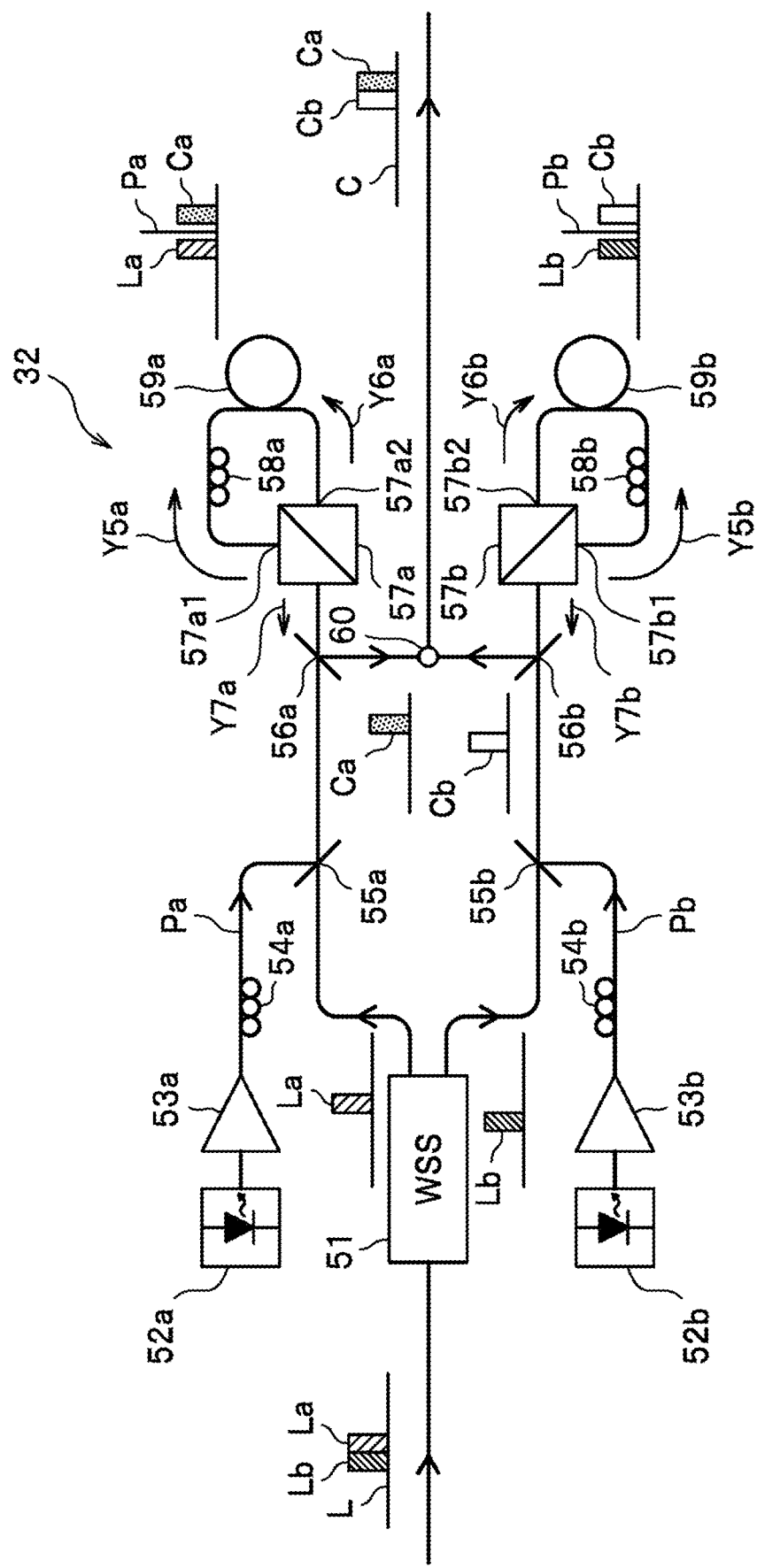
FIG. 2 is a block diagram illustrating the configuration of an L/C conversion unit according to the embodiment.

The L/C conversion unit 32 illustrated in FIG. 2 includes a WSS 51, wavelength-variable light sources 52a and 52b, amplifiers 53a and 53b, polarization controllers 54a and 54b, wavelength division multiplexing (WDM) couplers 55a, 55b, 56a, and 56b, polarization beam splitters 57a and 57b, polarization controllers 58a and 58b, loop-like high-nonlinearity fibers 59a and 59b, and an optical coupler 60.

However, in each of reference numerals 52a to 59b, "a" represents a component on the long-wavelength side of optical signals, and "b" represents a component on the short-wavelength side of optical signals.

In the polarization beam splitter 57a, two input/output ports 57a1 and 57a2 are connected in a loop-like shape by an optical fiber, and the loop-like high-nonlinearity fiber 59a is connected in the middle of the optical fiber. Further, the polarization controller 58a is connected between one input/output port 57a1 of the polarization beam splitter 57a and the high-nonlinearity fiber 59a.

Likewise, in the polarization beam splitter 57b, two input/output ports 57b1 and 57b2 are connected in a loop-like shape by an optical fiber, and the loop-like high-nonlinearity fiber 59b is connected in the middle of the optical fiber. Further, the polarization controller 58b is connected between one input/output port 57b1 of the polarization beam splitter 57b and the high-nonlinearity fiber 59b.

First, pump light that is output from the wavelength-variable light source 52a is amplified by the amplifier 53a, and the pump light Pa subjected to polarization control performed by the polarization controller 54a is input to the polarization beam splitter 57a via the WDM couplers 55a and 56a. At this stage, the pump light Pa is input to the polarization beam splitter 57a in a linearly polarized state, being inclined by 45 degrees with respect to the principal axis of the polarization beam splitter 57a. The inclination of 45 degrees is realized by the polarization control performed by the polarization controller 54a.

Likewise, pump light that is output from the wavelength-variable light source 52b is amplified by the amplifier 53b, and the pump light Pb subjected to polarization control performed by the polarization controller 54b is input to the polarization beam splitter 57b via the WDM couplers 55b and 56b. At this stage, the pump light Pb is input to the polarization beam splitter 57b in a linearly polarized state, being inclined by 45 degrees with respect to the principal axis of the polarization beam splitter 57b. The inclination of 45 degrees is realized by the polarization control performed by the polarization controller 54b.

Meanwhile, an L-band optical signal (also referred to as the optical signal L) is input from the demultiplexer 11a shown in FIG. 1 to the WSS 51 shown in FIG. 2 of the L/C conversion unit 32. The optical signal L is obtained by multiplexing an optical signal on the long-wavelength side La (also referred to as the long-wavelength-side optical signal La) and an optical signal on the short-wavelength side Lb (also referred to as the short-wavelength-side optical signal Lb).

The WSS 51 divides the optical signal L into the long-wavelength-side optical signal La and the short-wavelength-side optical signal Lb, and outputs the divided signals. The long-wavelength-side optical signal La is input to the polarization beam splitter 57a via the WDM couplers 55a and 56a. The short-wavelength-side optical signal Lb is input to the polarization beam splitter 57b via the WDM couplers 55b and 56b.

On the long-wavelength side of such a configuration, the long-wavelength-side optical signal La and the pump light Pa input to the polarization beam splitter 57a travel in a loop path in which the optical signal La and the pump light Pa are output from the first input/output port 57a1 of the polarization beam splitter 57a, and are input to the second input/output port 57a2 via the polarization controller 58a and the high-nonlinearity fiber 59a as indicated by an arrow Y5a.

In this loop path, the long-wavelength-side optical signal La and the pump light Pa output from the first input/output port 57a1 of the polarization beam splitter 57a are subjected to an optical four-wave mixing process (described later) by the high-nonlinearity fiber 59a while being subjected to polarization control by the polarization controller 58a. The high-nonlinearity fiber 59a is an optical fiber having a high nonlinearity constant as a parameter, and efficiently causes optical four-wave mixing in the loop to perform wavelength band conversion.

That is, the high-nonlinearity fiber 59a causes the two wavelength bands of the long-wavelength-side optical signal La and the pump light Pa to interact with each other as an intermodulation phenomenon caused in terms of nonlinear optics by an optical four-wave mixing process, and newly generates an optical signal Ca on the long-wavelength side in C-band, which is one wavelength band. The generated optical signal Ca, the long-wavelength-side optical signal La, and the pump light Pa are input to the second input/output port 57a2 of the polarization beam splitter 57a.

At the same time as this operation, the long-wavelength-side optical signal La and the pump light Pa that have been input to the polarization beam splitter 57a travel in a loop path in which the optical signal La and the pump light Pa are output from the second input/output port 57a2, and are input to the first input/output port 57a1 via the high-nonlinearity fiber 59a and the polarization controller 58a as indicated by an arrow Y6a in the opposite direction to the arrow Y5a. Also in this loop path, an optical signal on the long-wavelength side Ca in C-band (also referred to as the long-wavelength-side optical signal Ca) is newly generated through an optical four-wave mixing process in the same manner as above.

The two long-wavelength-side optical signals Ca generated by bidirectionally traveling in the above loop path are subjected to wavelength multiplexing by the polarization beam splitter 57a. As indicated by an arrow Y7a, the long-wavelength-side optical signals Ca are output toward the input side, extracted by the WDM coupler 56a, and output to the optical coupler 60.

Also on the short-wavelength side, the same wavelength band conversion process as that on the long-wavelength side is performed.

That is, the long-wavelength-side optical signal Lb and the pump light Pb input to the polarization beam splitter 57b travel in a loop path in which the optical signal Lb and the pump light Pb are output from the first input/output port 57b1 of the polarization beam splitter 57b, and are input to the second input/output port 57b2 via the polarization controller 58b and the high-nonlinearity fiber 59b as indicated by an arrow Y5b.

In this loop path, the long-wavelength-side optical signal Lb and the pump light Pb output from the first input/output port 57b1 are subjected to an optical four-wave mixing process by the high-nonlinearity fiber 59b while being subjected to polarization control by the polarization controller 58b. Through this process, an optical signal Cb on the short-wavelength side in C-band is newly generated, and is input to the second input/output port 57b2 of the polarization beam splitter 57b, together with the long-wavelength-side optical signal Lb and the pump light Pb.

At the same time as this operation, the long-wavelength-side optical signal Lb and the pump light Pb travel in a loop path from the second input/output port 57b2 of the polarization beam splitter 57b, as indicated by an arrow Y6b in the opposite direction to the arrow Y5b. Also in this loop path, an optical signal on the short-wavelength side Cb in C-band (also referred to as the short-wavelength-side optical signal Cb) is newly generated through an optical four-wave mixing process in the same manner as above.

The two short-wavelength-side optical signals Cb generated by bidirectionally traveling in the above loop path are subjected to wavelength multiplexing by the polarization beam splitter 57b, are output to the input side as indicated by an arrow Y7b, and are output to the optical coupler 60 via the WDM coupler 56b.

The optical coupler 60 combines the long-wavelength-side optical signals Ca and the short-wavelength-side optical signals Cb into a C-band optical signal. In this manner, the L/C conversion unit 32 converts an L-band optical signal supplied from the demultiplexer 11a into a C-band optical signal. The converted C-band optical signal is input to an optical amplifier 24a of the WXC unit 22A.

Operation According to the Embodiment

Next, an operation of the multiband transmission system 10A is described with reference to a flowchart shown in FIG. 3.

Figure 3:
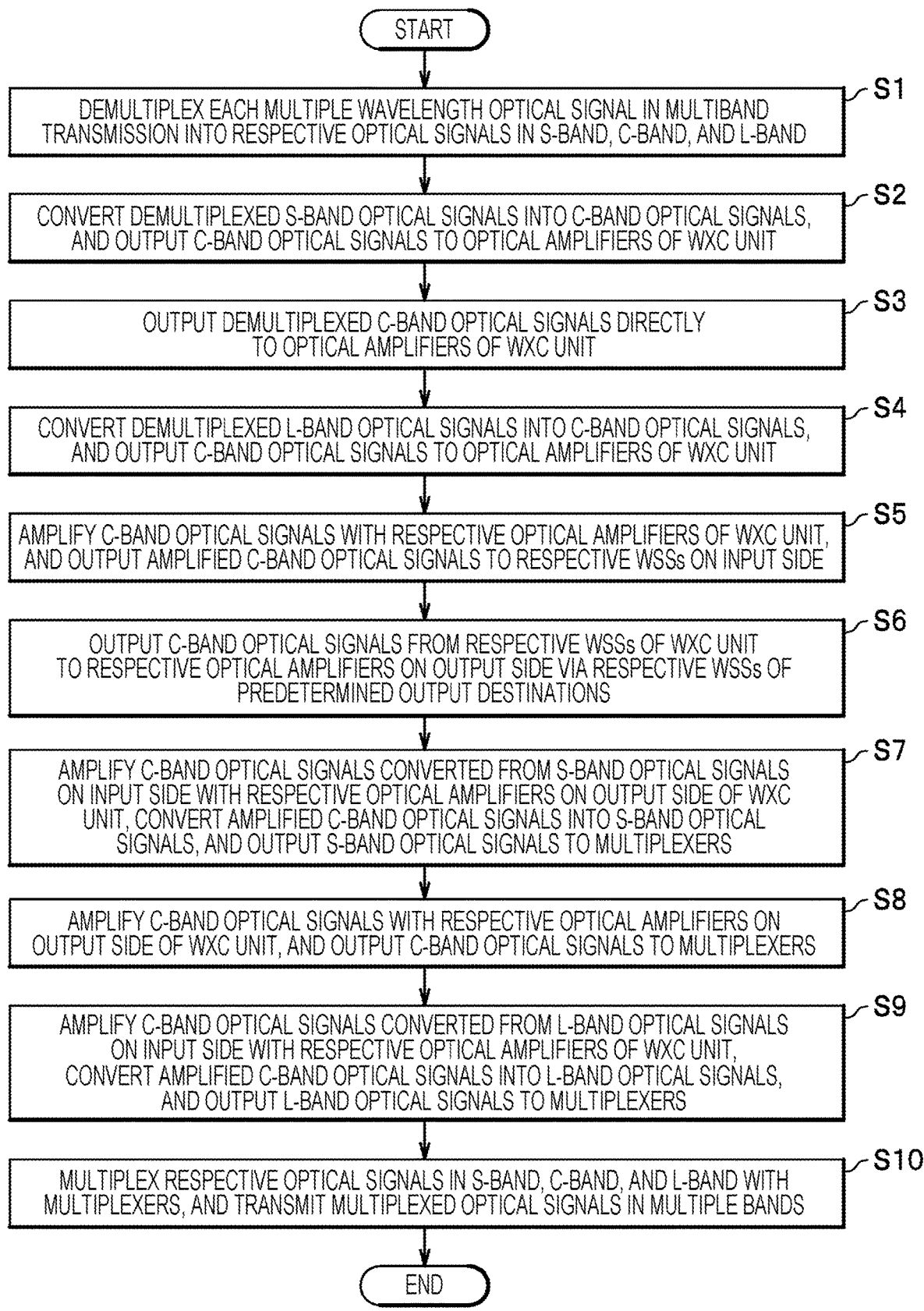
FIG. 3 is a flowchart for explaining an operation of the multiband transmission system according to the embodiment.

In step S1 shown in FIG. 3, the respective multiple wavelength signal light beams 1a to 1m transmitted in multiple bands from the input-side paths Mi shown in FIG. 1 are demultiplexed into respective optical signals in S-band, C-band, and L-band by the respective demultiplexers 11a to 11m.

In step S2, the demultiplexed S-band optical signals are converted into C-band optical signals by the respective S/C conversion units 31, and are output to the optical amplifiers 24a to 24m of the WXC unit 22A.

In step S3, the demultiplexed C-band optical signals are output directly to the optical amplifiers 24a to 24m.

In step S4, the demultiplexed L-band optical signals are converted into C-band optical signals by the respective L/C conversion units 32, and are output to the optical amplifiers 24b to 24m. Note that the processes in steps S2 to S4 may be performed in any order.

In step S5, the respective optical amplifiers 24a to 24m amplify the C-band optical signals, and output the C-band optical signals to the respective WSSs 25aA to 25mA.

In step S6, the respective WSSs 25aA to 25mA on the input side of the WXC unit 22A output the input C-band optical signals to the optical amplifiers 27a to 27m via predetermined WSSs 26aA to 26mA on the output side.

In step S7, the respective optical amplifiers 27a to 27m on the output side of the WXC unit 22A amplify the C-band optical signals converted by the S/C conversion units 31 on the input side, and output the amplified C-band optical signals to the C/S conversion units 35. The C/S conversion units 35 convert the C-band optical signals, which have been converted on the input side, into S-band optical signals, and output the S-band optical signals to the multiplexers 12a to 12m.

In step S8, the respective optical amplifiers 27a to 27m amplify the C-band optical signals, which have been input from the demultiplexers 11a to 11m directly to the WXC unit 22A, and output the C-band optical signals directly to the respective multiplexers 12a to 12m.

In step S9, the respective optical amplifiers 27a to 27m on the output side of the WXC unit 22A amplify the C-band optical signals converted by the L/C conversion units 32 on the input side, and output the amplified C-band optical signals to the C/L conversion units 36. The C/L conversion units 36 convert the C-band optical signals, which have been converted on the input side, into L-band optical signals, and output the L-band optical signals to the multiplexers 12a to 12m. Note that the processes in steps S7 to S9 may be performed in any order.

In step S10, the respective multiplexers 12a to 12m multiplex the input respective optical signals in S-band, C-band, and L-band, and transmit the multiplexed optical signals in multiple bands to the M paths Mo on the output side.

Effects of the Embodiment

The wavelength cross-connect device 20A of this embodiment performs a relay process in which the multiple wavelength signal light beams 1a to 1m that have been transmitted in multiple bands from a plurality of paths Mi each formed by binding one or a plurality of optical fibers in one path Mi, and been demultiplexed into optical signals in the respective wavelength bands (S-band, C-band, and L-band) for each path Mi are amplified by optical amplifiers, are switched to paths by the WSSs, and are output to the paths Mo on the output side.

(1a) The wavelength cross-connect device 20A includes the optical amplifiers 24a to 24m and 27a to 27m, and the contention WSSs 25aA to 25mA and 26aA to 26mA having a plurality of input ends and a plurality of output ends, and also includes the WXC unit 22A that performs a process of relaying optical signals in a predetermined specific wavelength band (C-band) among the different wavelength bands. The wavelength cross-connect device 20A also includes: on the input side of the WXC unit 22A, the input-side conversion units (the S/C conversion units 31 and the L/C conversion units 32) that convert optical signals in the wavelength bands other than the specific wavelength band into optical signals in the specific wavelength band; and, on the output side of the WXC unit 22A, the output-side conversion units (the C/S conversion units 35 and the C/L conversion units 36) that convert optical signals in the specific wavelength band, which have been converted by the input-side conversion units, into the optical signals prior to the conversion. In this configuration, optical signals in the specific wavelength band that have been input directly from the input side are directly output after the relay process at the WXC unit 22A.

This configuration includes the one WXC unit 22A that performs a relay process on optical signals in the specific wavelength band. Optical signals in the wavelength bands other than the specific wavelength band on the input side are converted into optical signals in the specific wavelength band by the input-side conversion units, and are input to the WXC unit 22A. Meanwhile, optical signals in the specific wavelength band on the input side are input directly to the WXC unit 22A. A plurality of optical signals in the specific wavelength band that are input to the WXC unit 22A are input from a plurality of input ends of the contention WSSs 25aA to 25mA on the input side, and are output from a plurality of output ends to a plurality of input ends of the contention WSSs 26aA to 26mA on the output side. Further, the optical signals are output from a plurality of output ends of the contention WSSs 26aA to 26mA on the output side. Thus, the optical signals are output from the WXC unit 22A. In this manner, the WXC unit 22A performs a relay process on optical signals in the specific wavelength band that is the same wavelength band.

If the optical signals in the specific wavelength band after the relay process are optical signals converted by the input-side conversion units, the optical signals are converted into the optical signals prior to the conversion by the output-side conversion units. The optical signals in the specific wavelength band that have been input directly from the input side are directly output after the relay process at the WXC unit 22A.

Therefore, the WXC unit 22A has a function of processing optical signals in the same wavelength band (the specific wavelength band), so that there will be no differences in optical characteristics due to differences in the wavelength band as in conventional multiband transmission.

In the conventional example, each of the WXC units 21 to 23 needs to be compatible with optical signal processing in different wavelength bands. In the present invention, however, optical signal processing can be performed in the same wavelength band (the specific wavelength band) by the single WXC unit 22A. Thus, the device size and the power consumption of the WXC unit 22A can be reduced.

Further, in the single WXC unit 22A of the present invention, optical signals in the same wavelength band are input and output. Accordingly, among the respective WXC units 21 to 23 as in the conventional example (FIG. 6), the transmission performance of the other WXC units 22 and 23 can be prevented from being limited by the S-band WXC unit 21 (FIG. 6) related to the wavelength band that lowers the technical maturity of components (WSSs 25aA to 25mA and 26aA to 26mA, and the optical amplifiers 24b to 24m and 27a to 27m). That is, it is possible to prevent the time to implement multiband-compatible WXC from being limited by an optical device in the wavelength band (S-band) that most requires a technical maturation period.

(2a) The specific wavelength band is the wavelength band (C-band) having the highest technical maturity among the wavelength bands in which the technical maturity of the components related to the transmission performance of the WXC unit 22A vary.

In this configuration, the WXC unit 22A includes components related to the specific wavelength band that maximizes the technical maturity, and thus, the transmission performance of the WXC unit 22A can be maximized.

Example Configuration of the Contention WSSs

Next, an example configuration of the contention WSSs 25aA to 25mA and 26aA to 26mA is described with reference to FIG. 4. Here, the WSS 25aA is described as a typical example.

Figure 4:
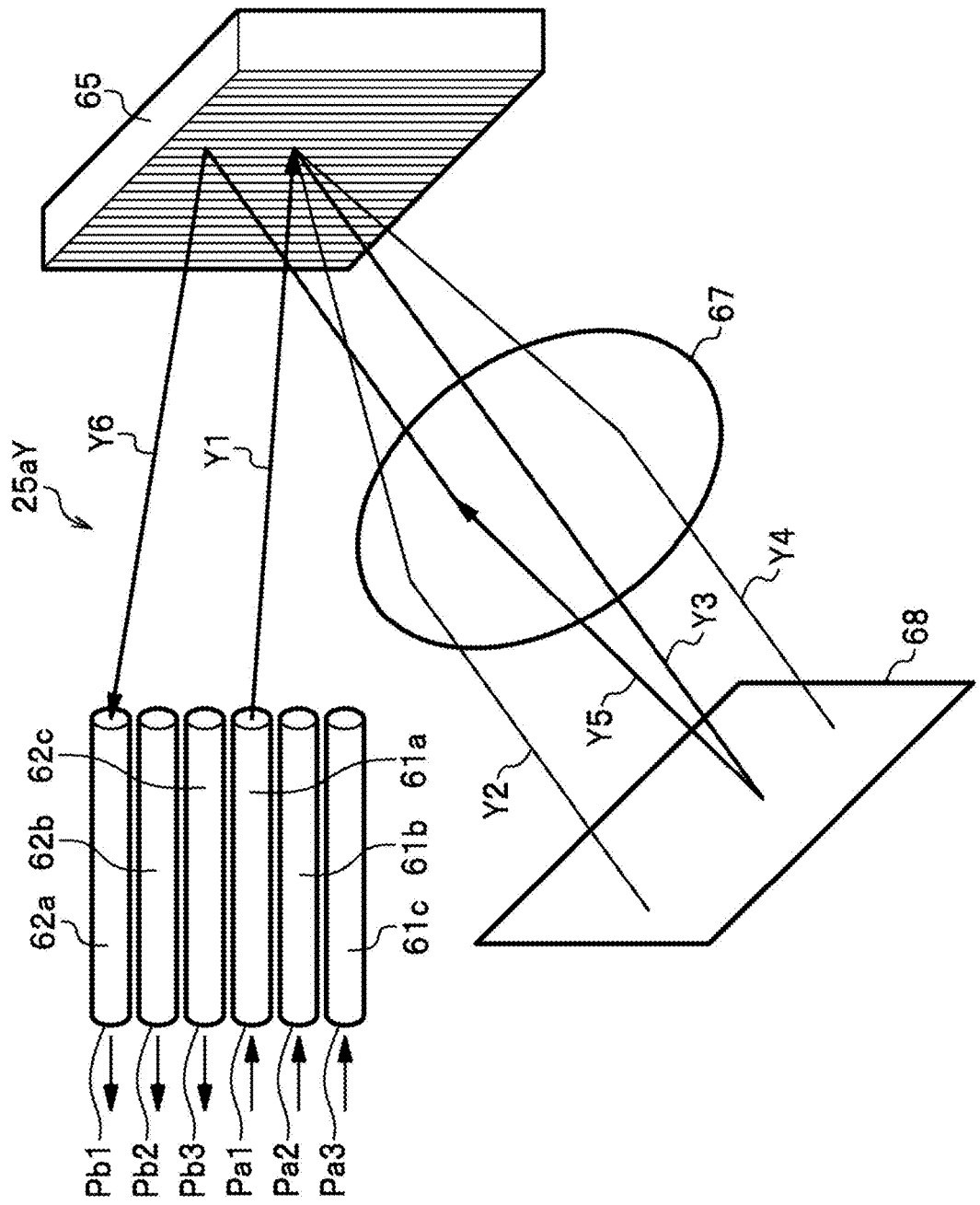
FIG. 4 is a perspective view illustrating an example configuration of a contention WSS.

The WSS 25aA illustrated in FIG. 4 includes three (W=3) input fiber collimators (also referred to as collimators) 61a, 61b, and 61c, three (W(M−1)=3) output collimators 62a, 62b, and 62c, a grating (a diffraction grating) 65 that demultiplexes optical signals subjected to wavelength division multiplexing, a lens 67, and an optical switching element 68 formed with liquid crystal on silicon (LCOS), for example. The input collimators 61 are connected to optical fibers (not shown) on the input side.

An operation of the WSS 25aA having such a configuration is now described. First, a C-band optical signal from the optical fiber enters the grating 65 from a first input end Pa1 via the collimator 61a, as indicated by an arrow Y1. The grating 65 diffracts and reflects the optical signal at different angles according to the wavelength, to perform demultiplexing (demultiplexing into three, for example) as indicated by arrows Y2, Y3, and Y4. The optical signal demultiplexed into three is made to enter the optical switching element 68 via the lens 67.

The optical switching element 68 reflects the optical signal demultiplexed into three. This reflection is performed so that the optical signal is made to enter the desired output collimator 62a via the lens 67 and the grating 65, and is output from the output end Pb1 of the collimator 62a, as indicated by an arrow Y5 as a representative of one optical signal. In other words, the reflection is performed so that the optical signal is output from an output end of the WSS25aA on the input side to the first input ends of the WSSs 26bA and 26mA on the output side.

In other words, the optical switching element 68 reflects the optical signal (arrow Y5) by changing the reflection angle for each wavelength so that the reflected optical signal is directed to the first output end Pb1 of the WSS25aA on the input side leading to the first input ends Pa1 of the WSS26bA and 26mA on the output side (FIG. 1).

However, the optical signal reflected by the grating 65 can enter the desired output collimator 62a. Since the reflection angle of the optical signal in the grating 65 changes with a change in the reflection angle of the optical switching element 68, the optical signal can enter the desired output collimator 62a through this process.

In such a configuration, the WSS 25aA can be formed with an optical system component obtained by combining the plurality of collimators 61a to 61c and 62a to 62c, the grating 65, the lens 67, and the optical switching element 68, and the plurality of WSSs 25aA to 25mA or the WSSs 26aA to 26mA can be formed with a combination of such optical system components. Accordingly, the plurality of WSSs 25aA to 25mA or the WSSs 26aA to 26mA can be integrated, and thus, the wavelength cross-connect device 20A can be made smaller in size.

Figure 5:
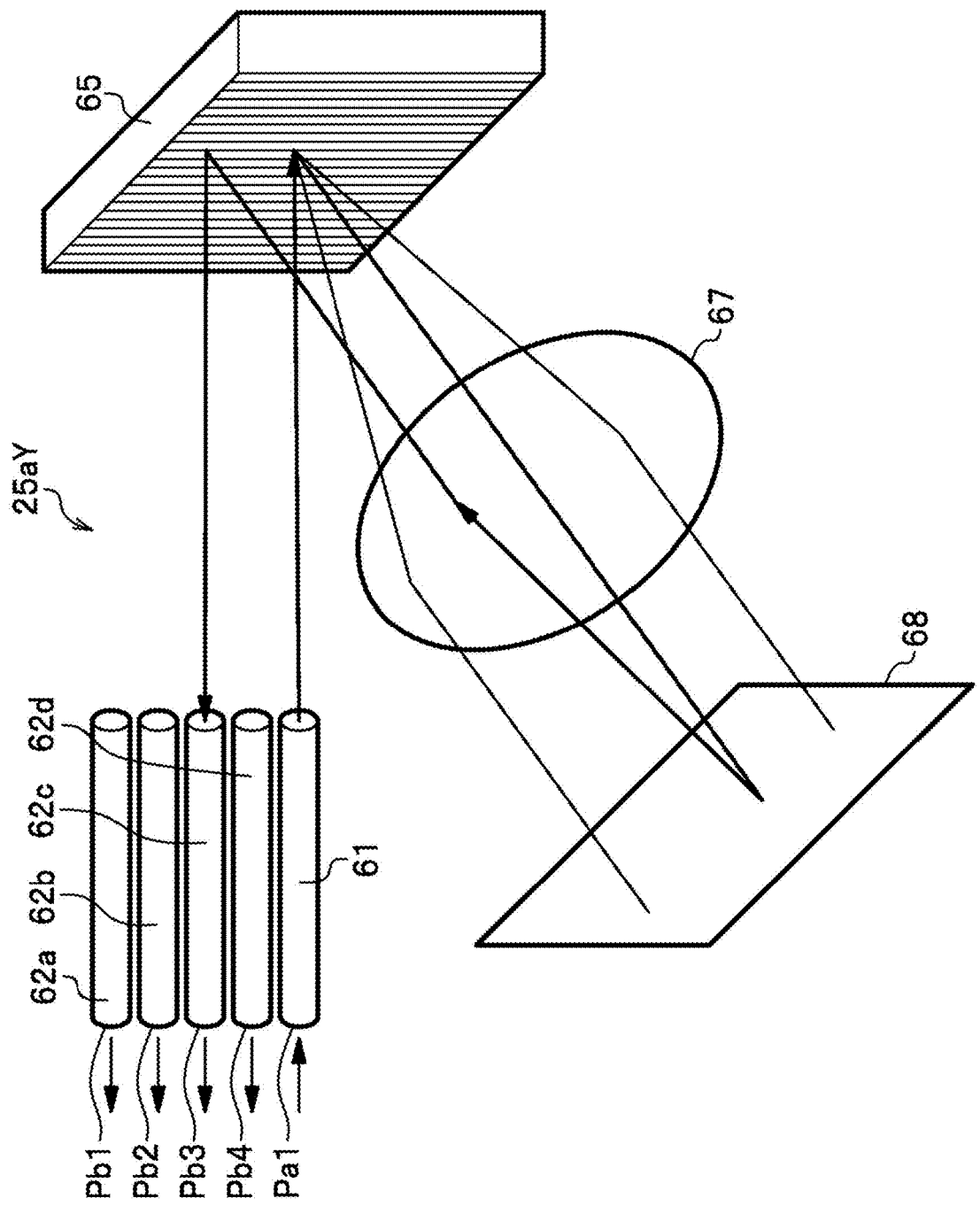
FIG. 5 is a perspective view illustrating an example configuration of a general-purpose contention WSS.

Further, as illustrated in FIG. 5, a WSS having a configuration including a plurality of outputs Pb1 to Pb4 with one input Pa1 exists as a general-purpose type by a mature technology. With this WSS, a contention WSS having the configuration illustrated in FIG. 4 can be easily created.

Effects (1) A wavelength cross-connect device performs a relay process of amplifying, with an optical amplifier, optical signals in respective wavelength bands formed by demultiplexing multiple wavelength signal light into different wavelength bands for each path, changing paths with a contention wavelength selective switch (WSS) having a plurality of input ends and a plurality of output ends, and outputting the optical signals to a path on the output side, the multiple wavelength signal light being formed by multiplexing respective optical signals in a plurality of wavelength bands transmitted in multiple bands through an optical transmission line formed with one or a plurality of optical fibers. The wavelength cross-connect device includes: a wavelength cross-connect (WXC) unit that includes the optical amplifier and the contention WSS, and performs the relay process on an optical signal in a predetermined specific wavelength band among the different wavelength bands; an input-side conversion unit that is disposed on the input side of the WXC unit, and converts an optical signal in a wavelength band other than the specific wavelength band into an optical signal in the specific wavelength band; and an output-side conversion unit that is disposed on the output side of the WXC unit, and converts the optical signal in the specific wavelength band converted by the input-side conversion unit into the optical signal prior to conversion. The optical signal in the specific wavelength band that has been input directly from the input side is directly output after the relay process at the WXC unit.

This configuration includes one WXC unit that performs a relay process on an optical signal in the specific wavelength band. Optical signals in the wavelength bands other than the specific wavelength band on the input side are converted into optical signals in the specific wavelength band by the input-side conversion unit, and are input to the WXC unit. Meanwhile, optical signals in the specific wavelength band on the input side are input directly to the WXC unit. A plurality of optical signals in the specific wavelength band that are input to the WXC unit are input from a plurality of input ends of contention WSSs on the input side, and are output from a plurality of output ends to a plurality of input ends of contention WSSs on the output side. Further, the optical signals are output from a plurality of output ends of the contention WSSs on the output side. Thus, the optical signals are output from the WXC unit 22A. In this manner, the WXC unit performs a relay process on optical signals in the specific wavelength band that is the same wavelength band.

If the optical signals in the specific wavelength band after the relay process are optical signals converted by the input-side conversion unit, the optical signals are converted into the optical signals prior to the conversion by the output-side conversion unit. The optical signals in the specific wavelength band that have been input directly from the input side are directly output after the relay process at the WXC unit.

Therefore, the WXC unit has a function of processing optical signals in the same wavelength band (the specific wavelength band), so that there will be no differences in optical characteristics due to differences in the wavelength band as in conventional multiband transmission.

In the conventional example, each of the WXC units needs to be compatible with optical signal processing in different wavelength bands. In the present invention, however, optical signal processing can be performed in the same wavelength band (the specific wavelength band) by one WXC unit. Thus, the device size and the power consumption of the WXC unit can be reduced.

Further, in the WXC unit of the present invention, optical signals in the same wavelength band are input and output. Accordingly, among the respective WXC units as in the conventional example, the transmission performance of the other WXC units can be prevented from being limited by the S-band WXC unit related to the wavelength band that lowers the technical maturity of components (WSSs and optical amplifiers). That is, it is possible to prevent the time to implement multiband-compatible WXC from being limited by an optical device in the wavelength band (S-band) that most requires a technical maturation period.

(2) In the above (1), the specific wavelength band is the wavelength band having the highest technical maturity among the wavelength bands in which the technical maturity of the components related to the transmission performance of the WXC unit varies.

In this configuration, all the WXC units include components related to the specific wavelength band that maximizes the technical maturity, and thus, all the WXC units can be integrated into a function that can maximize transmission performance.

(3) The wavelength cross-connect device according to claim 1 or 1, in which the contention WSS includes: a plurality of input collimators to which optical signals are input; a diffraction grating to which the optical signals are input via the input collimators, the diffraction grating diffracting and reflecting the optical signals at different angles in accordance with the wavelengths of the optical signals, to perform demultiplexing; an optical switching element to which the optical signals demultiplexed by the diffraction grating are input, the optical switching element reflecting the input optical signals to the diffraction grating; and a plurality of output collimators to which the optical signals reflected by the optical switching element and further reflected by the diffraction grating are input, the output collimators outputting the input optical signals.

In this configuration, the contention WSS can be formed with an optical system component obtained by combining the plurality of collimators, the diffraction grating, and the optical switching element, and a plurality of contention WSSs can be formed with a combination of such optical system components. Accordingly, a plurality of contention WSSs can be integrated, and thus, the wavelength cross-connect device 20A can be made smaller in size. Further, a WSS having one input and a plurality of outputs exists as a general-purpose type by a mature technology. With this WSS, the contention WSS can be easily created.

In addition to the above, the specific configuration can be modified as appropriate, without departing from the scope of the present invention.

REFERENCE SIGNS LIST 1a to 1m multiple wavelength signal light beam
11a to 11m wavelength band demultiplexer
12a to 12m wavelength band multiplexer
20A wavelength cross-connect device
22A WXC unit
24b to 24m, 27a to 27m optical amplifier
25aA to 25mA, 26aA to 26mA contention WSS
31 S/C conversion unit
32 L/C conversion unit
35 C/S conversion unit
36 C/L conversion unit

The invention claimed is:

1. A wavelength cross-connect device configured to perform a relay process of amplifying, with an optical amplifier, optical signals in respective wavelength bands provided by demultiplexing multiple wavelength signal light into different wavelength bands for each of a plurality of paths, changing paths with a contention wavelength selective switch (WSS) having a plurality of input ends and a plurality of output ends, and outputting the optical signals to a path on an output side, the multiple wavelength signal light being provided by multiplexing respective optical signals in a plurality of wavelength bands transmitted in multiple bands through an optical transmission line including at least one optical fiber, the wavelength cross-connect device comprising:
  a wavelength cross-connect (WXC) unit that includes the optical amplifier and the contention wavelength selective switch (WSS} and that is configured to perform the relay process on an optical signal in a predetermined specific wavelength band among the different wavelength bands, wherein
  an input side of the WXC includes a different input WSS for each set of W input optical amplifiers included in the WXC, and
  W is greater than one and represents a number of different wavelength bands among the different wavelength bands;
  an input-side conversion unit, comprising a circuitry, that is disposed at an input side of the WXC unit and that is configured to convert a first optical signal in a wavelength band other than the predetermined specific wavelength band into a second optical signal in the predetermined specific wavelength band; and
  an output-side conversion unit, comprising a circuitry, that is disposed at an output side of the WXC unit and that is configured to convert the second optical signal into the first optical signal,
  wherein the second optical signal in the predetermined specific wavelength band that has been input directly from the input side is directly output after the relay process at the WXC unit:
  wherein:
  the output side of the WXC includes a different output WSS for each set of W input optical amplifiers included in the WXC, and
  each different input WSS is connected to fewer than all of the different output WSSs.

2. The wavelength cross-connect device according to claim 1, wherein the predetermined specific wavelength band is a wavelength band having a highest technical maturity among the wavelength bands in which a technical maturity of each of components related to transmission performance of the WXC unit varies.

3. The wavelength cross-connect device according to claim 1 wherein the contention WSS includes:
  a plurality of input collimators configured to receive optical signals;
  a diffraction grating, comprising a circuitry, to which the optical signals are input via the plurality of input collimators, the diffraction grating configured to diffract and reflect the optical signals at different angles in accordance with wavelengths of the optical signals, to perform demultiplexing;
  an optical switch configured to receive the optical signals demultiplexed by the diffraction grating and reflect the received optical signals to the diffraction grating; and
  a plurality of output collimators configured to receive the optical signals reflected by the optical switch and further reflected by the diffraction grating and output the received optical signals.

4. A wavelength cross-connect method implemented by a wavelength cross-connect device, the wavelength cross-connect device performing a relay process of amplifying, with an optical amplifier, optical signals in respective wavelength bands provided by demultiplexing multiple wavelength signal light into different wavelength bands for each of a plurality of paths, changing paths with a contention WSS having a plurality of input ends and a plurality of output ends, and outputting the optical signals to a path on an output side, the multiple wavelength signal light being provided by multiplexing respective optical signals in a plurality of wavelength bands transmitted in multiple bands from a plurality of paths including at least one optical fiber into one path, wherein the wavelength cross-connect device includes a wavelength cross-connect (WXC) unit that includes the optical amplifier and the contention WSS, the wavelength cross-connect method comprising:
  performing the relay process on an optical signal in a predetermined specific wavelength band among the different wavelength bands;
  converting a first optical signal in a wavelength band other than the predetermined specific wavelength band into a second optical signal in the predetermined specific wavelength band;
  converting the converted second optical signal in the predetermined specific wavelength band into the first optical signal;
  inputting, at an input side of the WXC that includes a different input WSS for each set of W input optical amplifiers included in the WXC, the converted second optical signal, wherein W is greater than one and represents a number of different wavelength bands among the different wavelength bands; and
  outputting, after the relay process at the WXC unit, the second optical signal in the predetermined specific wavelength band that has been input directly to the WXC unit;
  wherein:
  the output side of the WXC includes a different output WSS for each set of W input optical amplifiers included in the WXC, and
  each different input WSS is connected to fewer than all of the different output WSSs.

5. The wavelength cross-connect method according to claim 4, wherein the predetermined specific wavelength band is a wavelength band having a highest technical maturity among the wavelength bands in which a technical maturity of each of components related to transmission performance of the WXC unit varies.

* * * * *